United States Patent [19]
Chen

[11] Patent Number: 5,035,265
[45] Date of Patent: Jul. 30, 1991

[54] STRUCTURE OF PIPE PLUG

[76] Inventor: Chung F. Chen, 26272 Tarrasa La., Mission Viejo, Calif. 92691

[21] Appl. No.: 458,026

[22] Filed: Dec. 28, 1989

[51] Int. Cl.[5] .................. F16L 55/10; B65D 59/02
[52] U.S. Cl. ............................. 138/89; 138/96 R
[58] Field of Search ............... 138/89, 91, 93, 96 R, 138/97, 98, 109; 220/233, 234, 235, 304

[56] References Cited

U.S. PATENT DOCUMENTS

| | | | |
|---|---|---|---|
| 3,412,759 | 11/1968 | Potter et al. | 138/89 |
| 4,175,671 | 11/1979 | Holl et al. | 220/235 |
| 4,303,101 | 12/1981 | Tholen | 138/89 |

FOREIGN PATENT DOCUMENTS

| | | | |
|---|---|---|---|
| 8701788 | 2/1987 | France | 138/89 |
| 2610386 | 8/1988 | France | 138/189 |
| 2147079 | 9/1983 | United Kingdom | 138/89 |

Primary Examiner—Daniel P. Stodola
Assistant Examiner—John P. Darling
Attorney, Agent, or Firm—Lowe, Price, LeBlanc & Becker

[57] ABSTRACT

A pipe plug for sealing the orifice of a pipe, which can be operated through one hand and is comprised of a fastening element, an elastic rubber band, a pressure plate and a lifting eye. The rubber band has rubber pins upstanding from its top surface and set in the grooves of the pressure plate to rub against the edge of a pipe for the positioning of the pressure plate so that the pipe plug can be conveniently operated with one single hand to squeeze the rubber band to expand and to further tightly seal the orifice of the pipe into which the pipe plug is inserted.

1 Claim, 7 Drawing Sheets

STRUCTURE OF PIPE PLUG

BACKGROUND OF THE INVENTION

The present invention is related to a pipe plug for sealing underground electric pipings, and more particularly to the one which can be conveniently operated to seal the orifice of a pipe with a single hand.

There is illustrated in FIG.1 a pipe plug according to the prior art, which is generally comprised of a fastening element (1A), a rubber band (2A), a pressure plate (3A) and a lifting eye (4A). The lifting eye (4A) is screwed up with the fastening element (1A) to force the pressure plate (3A) to squeeze the rubber band (2A) for that the pipe plug can be firmly retained in the orifice of a pipe (5). In this structure, the pressure plate (3A) comprises three projecting portions (31A) for the positioning of the pipe plug on the orifice of a pipe. During installation to seal the orifice of a pipe, the pipe plug must be well positioned on the orifice of such a pipe with both hands. While screwing up the lifting eye (4A) with the fastening element (1A) to force the pressure plate (3A) to squeeze the rubber band (2A) to expand, one must firmly press on the pressure plate (3A) with one hand and turn the lifting eye (4A) to ratate with the other hand. If the pressure plate (3A) is not firmly retained, the whole structure of the pipe plug will be carried by the lifting eye (4A) to rotate altogether, and the rubber band (2A) will not be squeezed to expand. In case a pipe is fully filled with various cables, it will be very difficult to seal the orifice of such a pipe with a conventional pipe plug by means of the operation through both two hands. If a pipe is embedded under the ground, one must prostrate oneself so as to position a conventional pipe plug in the orifice of such a pipe. In this case, it is inconvenient to squeeze the rubber band of the installed pipe plug with both hands.

SUMMARY OF THE INVENTION

One feature of the present invention is that the rubber band comprises a plurality of elastic rubber pins which are set in corresponding grooves on the pressure plate and simultaneously rub against the edge of the orifice of the associated pipe to produce a friction force when the lifting eye is turned to screw up with the fastening element to force the pressure plate to squeeze the rubber band to expand. Therefore, the pipe plug of the present invention can be conveniently operated by means of single hand.

Another feature of the present invention is that the lifting eye comprises a bottom flange having a plurality of convex strips thereon, while the pressure plate comprises a broken convex strip portion on its boring bore, and two retainer members which have a plurality of convex strips on respective bottom surface. When the fastening element, the elastic rubber band, the pressure plate and the lifting eye are connected together, the screw rod of the fastening element can be secured to the pressure plate by its broken convex strip portion with the rubber band retained therebetween, and the lifting eye can be simultaneously secured to the pressure plate by means of the engagement of the convex strips of the bottom flange of the lifting eye with the convex strips on the bottom surface of the retainer members of the pressure plate. Because all the parts of the pipe plug can be retained together, it will be very convenient to install in the orifice of a pipe in a narrow working space. When the lifting eye is turned to loosen the rubber band, the convex strips on its bottom flange will rub against the convex strips on the bottom surface of the retainer members to produce a striking sound. Through such a striking sound, one can know well about the status of the operation.

Still another feature of the present invention is that the lifting eye comprises a circular projection on the bottom surface of its bottom flange, so that the contact area and the friction force between the lifting eye and the pressure plate can be minimized.

ADVANTAGES OF THE PRESENT INVENTION

The advantages that the present invention can provide are outlined as hereinafter.

1. Easy to install through single hand.
2. Practical in use and convenient for sealing a pipe in a narrow working space or embedded underground.
3. Good protection of its component parts against dropping.
4. Striking sound indicatioin of the operating status.

| DESCRIPTION OF THE DESIGNATED NUMERALS: | |
| --- | --- |
| (1) Fastening element | (11) Loop |
| (12) Screw rod | (13) Groove |
| (14) Base panel | (15) Tapered wall portion |
| (2) Elastic rubber band | (21) Elastic rubber pin |
| (22) Boring bore | (23) Tapered bottom end |
| (3) Pressure plate | (31) Recess hole |
| (32) Boring bore | (33) Retainer member |
| (34) Convex strip | (35) Groove |
| (36) Convex strip | (37) Bottom end |
| (4) Lifting eye | (41) Bottom flange |
| (42) Convex strip | (43) Inner thread |
| (44) Circular projection | (5) Orifice tube |

DETEILED DESCRIPTION OF THE PREFERRED EMBODIMENTS

Figure 1:
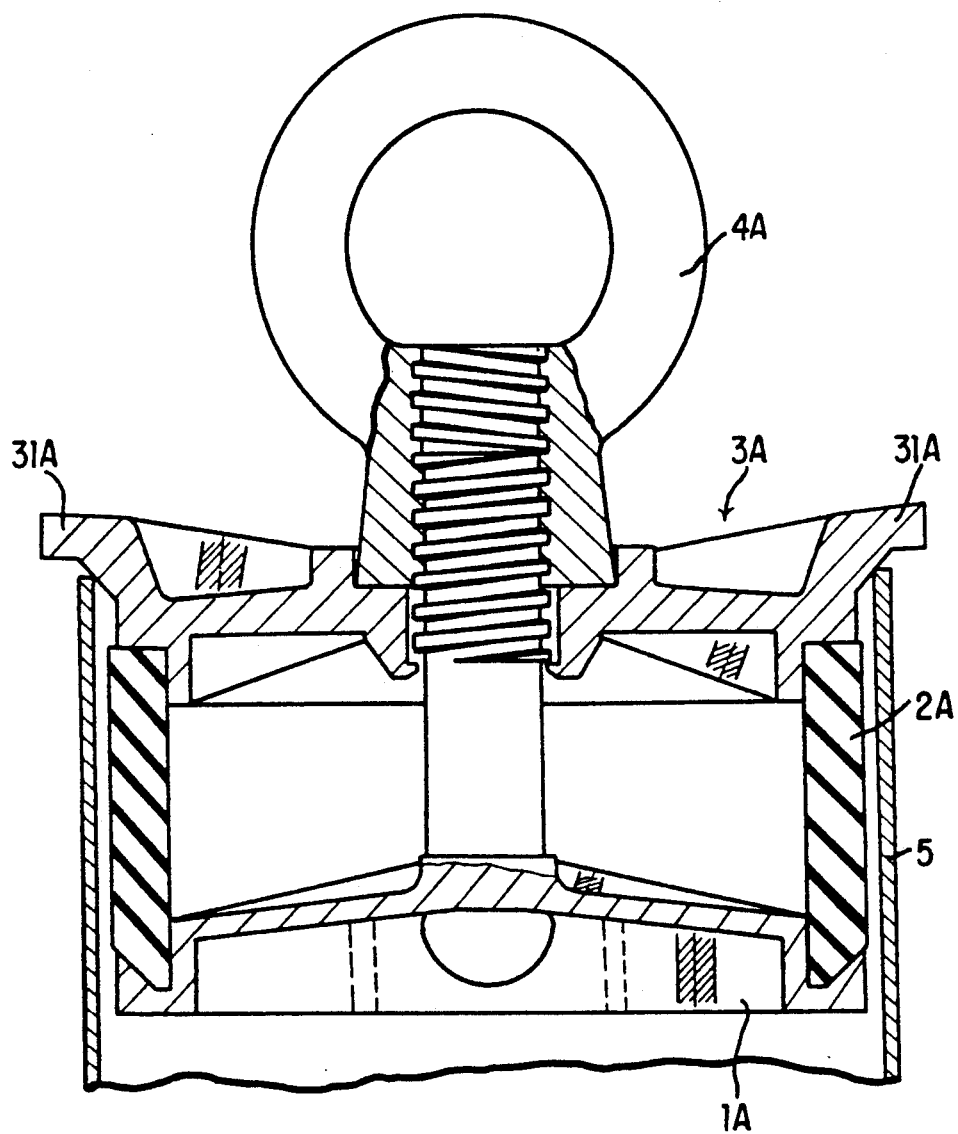
FIG. 1 is a pipe plug according to the prior art.
Figure 2:
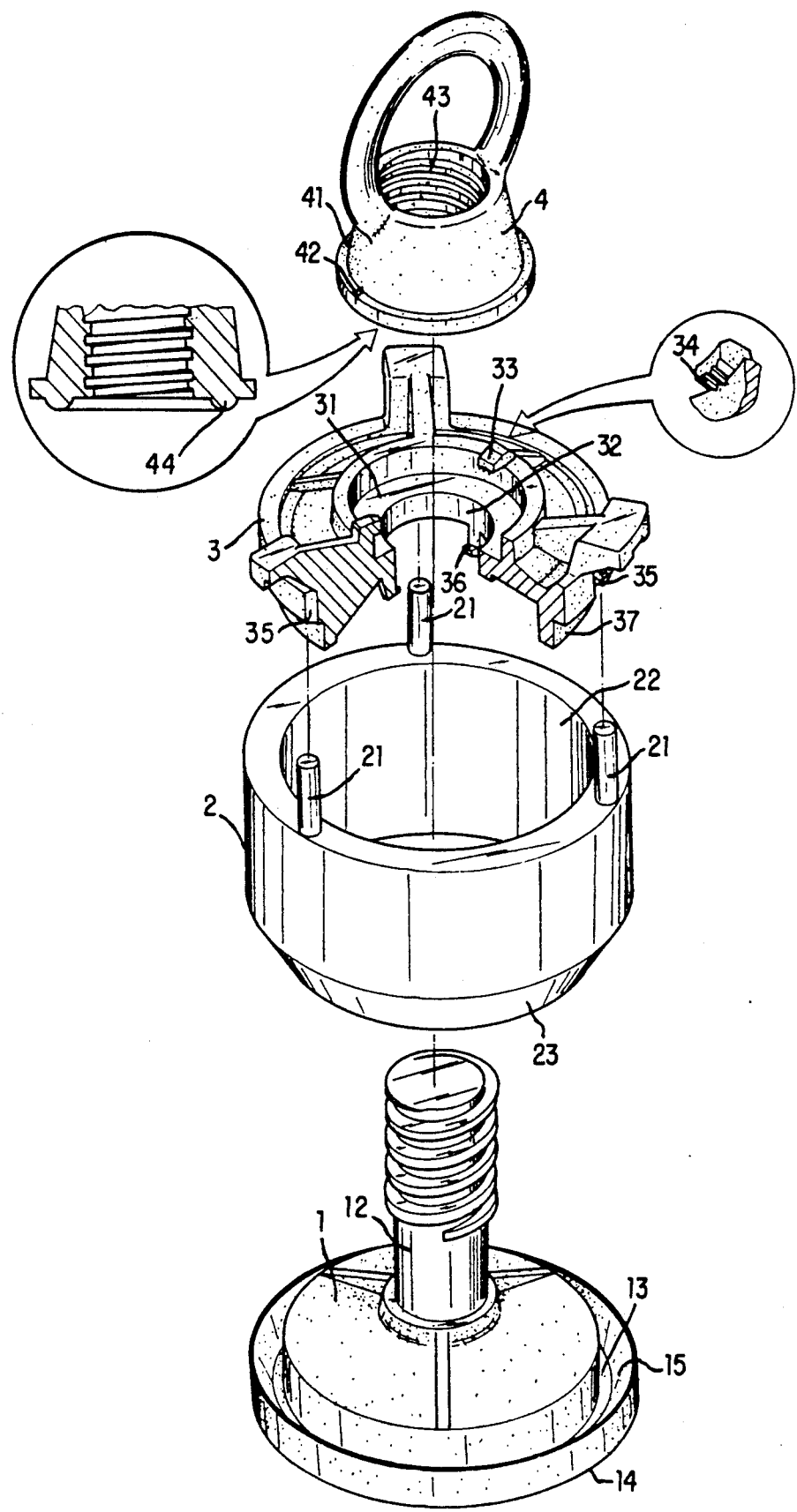
FIG. 2 is a fragmentary perspective view of a pipe plug according to the present invention.
Figure 3:
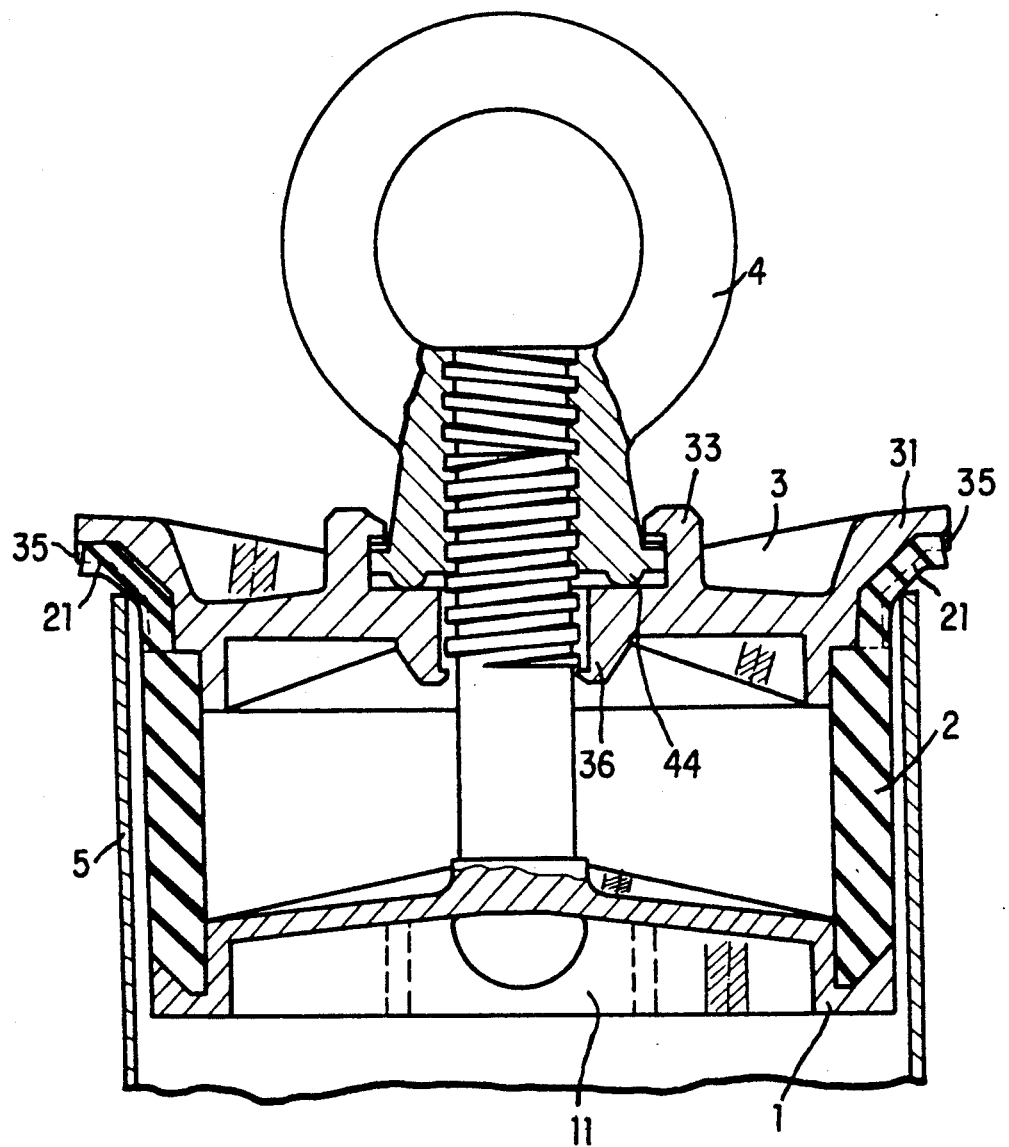
FIG. 3 is a sectional elevation of the pipe plug on FIG. 2, in which the elastic rubber band is not squeezed to expand.

Turning now to the annexed drawings in greater detail and referring first to FIG. 3, therein illustrated is a pipe plug embodying the present invention and generally comprised of a disc-like fastening element (1), an elastic rubber band (2), a trapezoid pressure plate (3), and a lifting eye (4). The disc-like fastening element (1) comprises a base panel (14) having a groove (13) thereon defining therewith a circularly inwardly tapered wall portion (15), and a screw rod (12) upstanding therefrom in its center. The elastic rubber band (2) has a hollow body comprising an inward tapered bottom end (23) corresponding to the radially inwardly tapered wall portion (15) of the disc-like fastening element (1), and several flexible rubber pins (21) upstanding from its top wall surface. The trapezoid pressure plate (3) is mounted on the elastic rubber band (2) to give a pressure, which comprises several grooves (35) for the setting therein of the elastic rubber pins (21) of the elastic rubber band (2), a circular bottom end (37) inserted in the boring bore (22) of the elastic rubber band (2), an upper recess hole (31) for the setting therein of the lifting eye (4), two L-shaped retainer members (33) made on the top of the sidewall portion of the upper recess hole (31), a boring bore (32) through its central axis, and a broken convex strip portion (36) on the wall surface of its boring bore (32) for the positionong of the screw rod (12) of the disc-like fastening element (1). The two L-shaped retainer members (33) each comprises a plurality of unitary convex strips (34) on its bottom surface. The lifting eye (4) comprises an innner thread portion (43) for screwing up with the other thread of the screw rod (12) of the fastening element (1), and a bottom flange (41) having several convex strips (42) thereon. When the lifting eye (4) is turned round, after its bottom flange (41) has been inserted in the upper recess hole (31) of the trapezoid pressure plate (3) during the assembly, the convex strips (42) of the lifting eye (14) will rub against the convex strips (34) of the trapezoid pressure plate (3) to produce a striking sound. An unitary circular projection (44) is made on the bottom surface of the bottom flange (41) to minimze the contact area and the friction of the lifting eye (4) with the upper recess hole (31).

Figure 4:
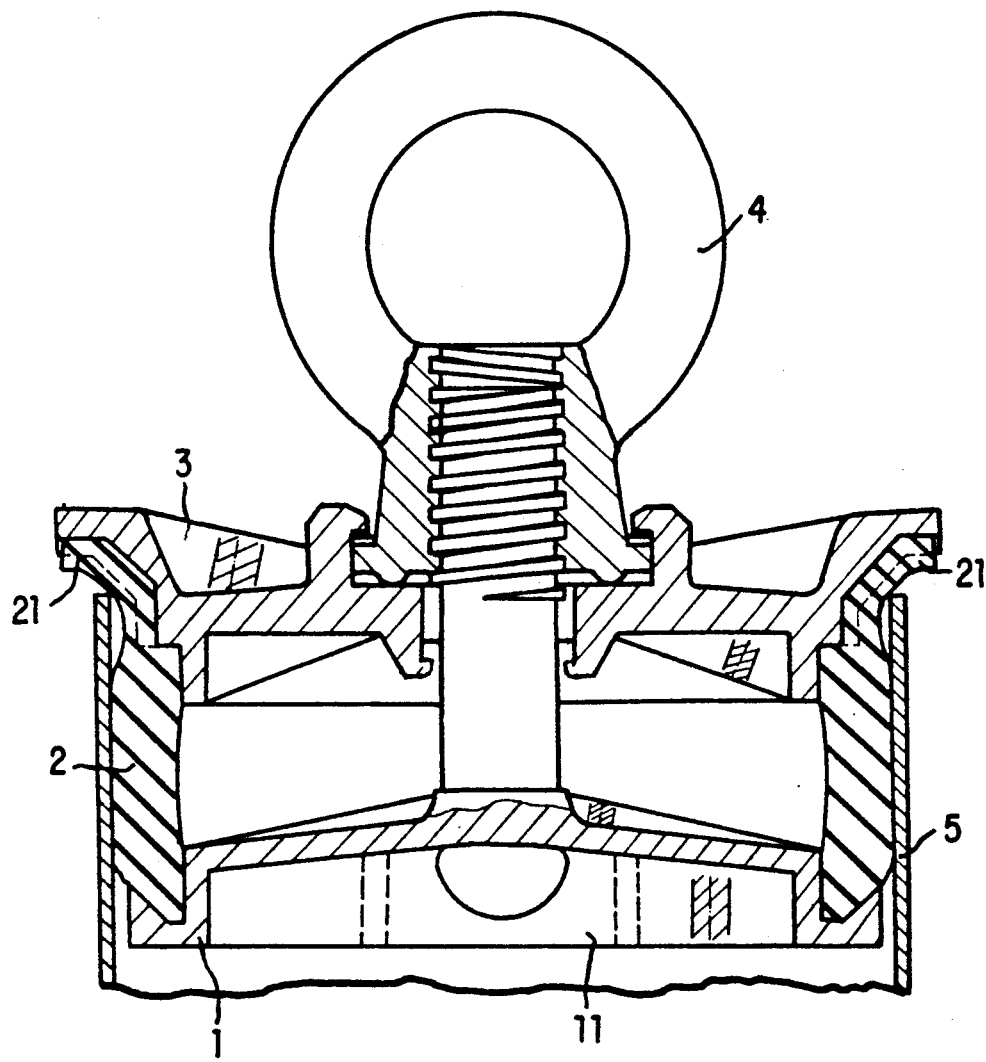
FIG. 4 is a sectional elevation of the pipe plug of FIG. 2, in which the elastic rubber band is squeezed to expand.

Referring to FIG. 3, the elastic rubber band (2) is mounted on the screw rod (12) amd squeezed in between the fastening element (1) and the pressure plate (3), and the lifting eye (4) is set in the upper recess hole (31) of the pressure plate (3) and screwed up with the screw rod (12) of the fastening element (1), permitting the elastic rubber pins (21) to dispose in the groove (35). Under this condition, the elastic rubber pins (21) are partly exposed outside and partly in contact with the edge of a pipe (5) into which the present pipe plug is inserted. Through a single hand, the lifting eye (4) can be conveniently pressed downward to force the elastic rubber pins (21) against the pipe (5), and then turned around to tightly screw up with the screw rod (12) so as to squeeze the elastic rubber band (2) to expand (see FIG. 4). Thus; the orifice of the pipe (5) can be tightly sealed. When removing the pipe plug from the pipe (5), the lifting eye (4) is turned in counter direction to release the pressure from the elastic rubber band (2), and the pipe plug can be easily taken out of the pipe (5).

Because cable conduit pipes are generally set under the ground, it is not easy to see clearly the operation during securing a pipe plug to a pipe. Through the arrangement of the convex strips (42) and (34), the loosening of the elastic rubber band (2) can be well noticed by means of the striking sound which is produced at each half turn during screwing loose the lifting eye (4) from the screw rod (12) of the disc-like fastening element (1). Through the engagement of the circularly inwardly tapered wall portion (15) of the fastening element (1) with the circularly tapered bottom end (23) of the elastic rubber band (2), the elastic rubber band (2) will be accurately squeezed to expand outward when the lifting eye (4) is turned to tightly screw up with the screw rod (12) of the fastening element (1).

Figure 5:
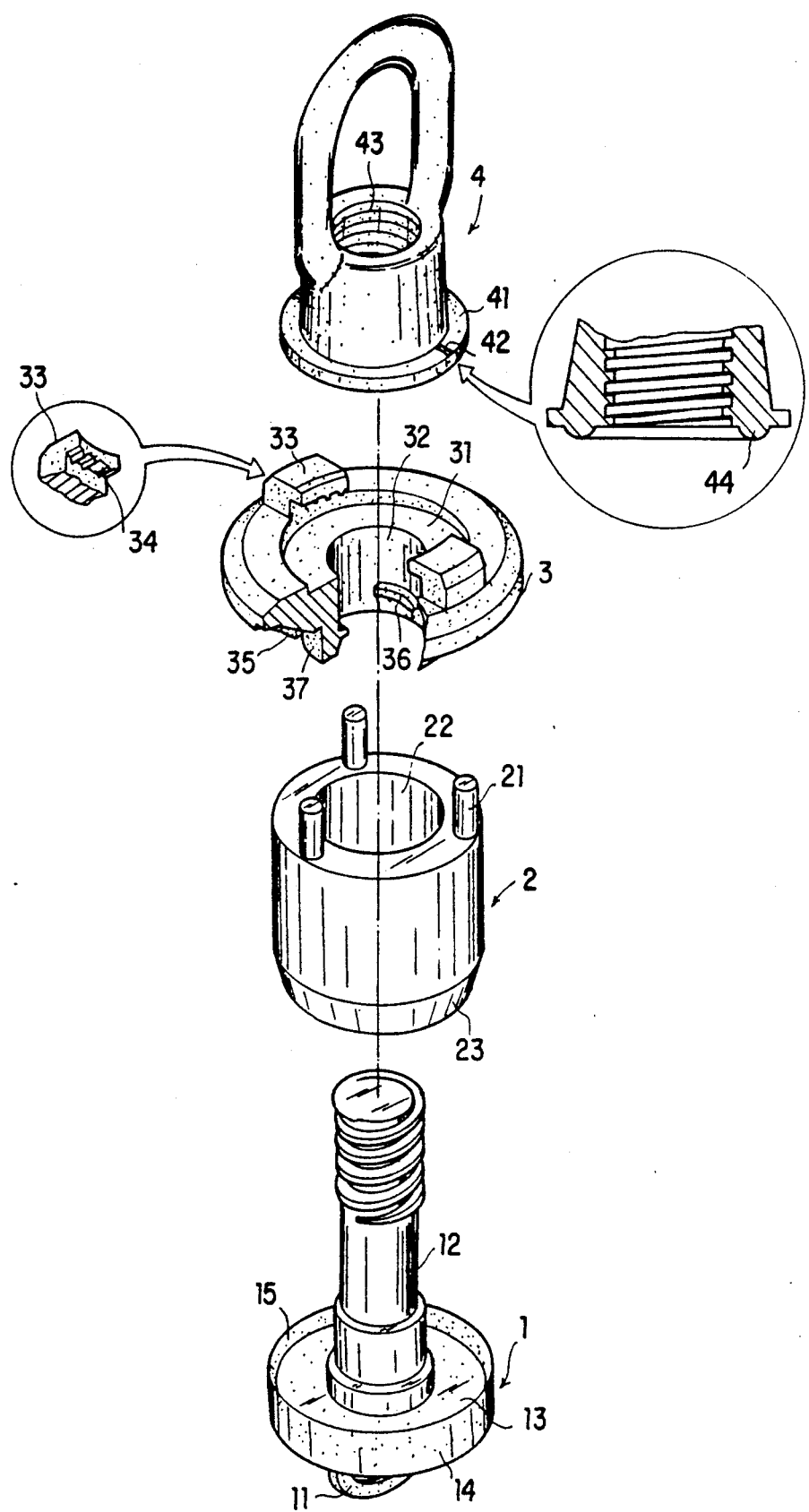
FIG. 5 is a fragmentary view of another embodiment of the present invention for sealing a pipe of smaller caliber.
Figure 6:
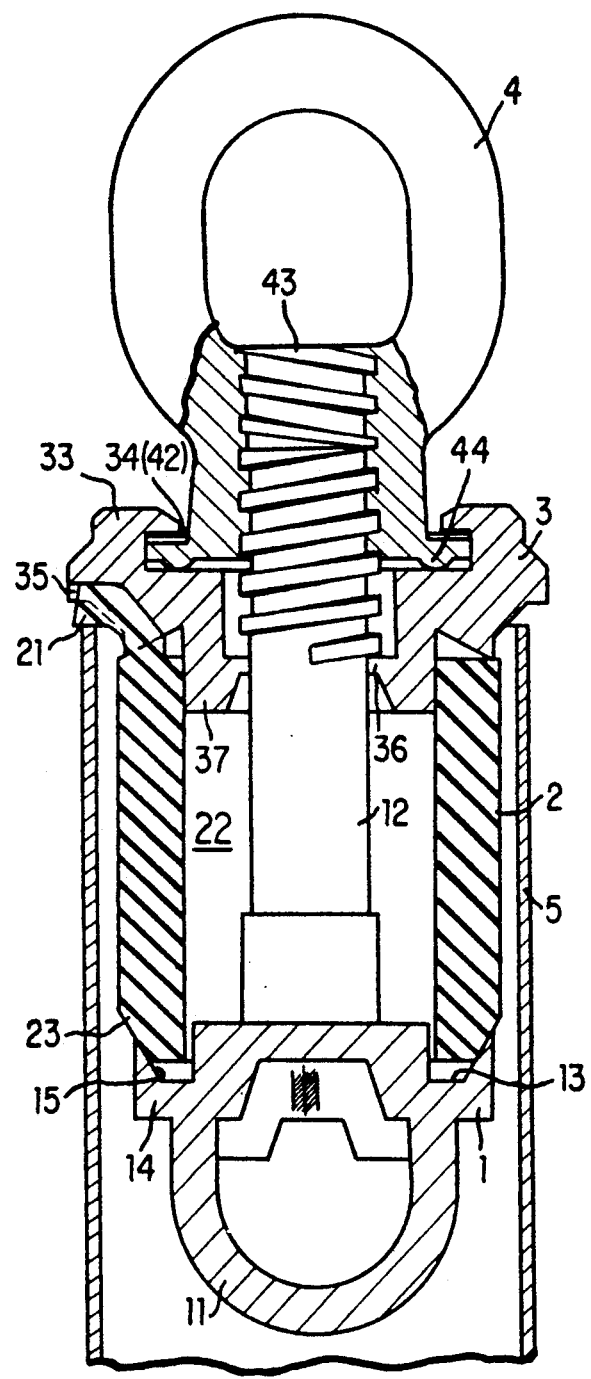
FIG. 6 is a sectional elevation of the pipe plug of FIG. 5, in which the elastic rubber band is not squeezed to expand.
Figure 7:
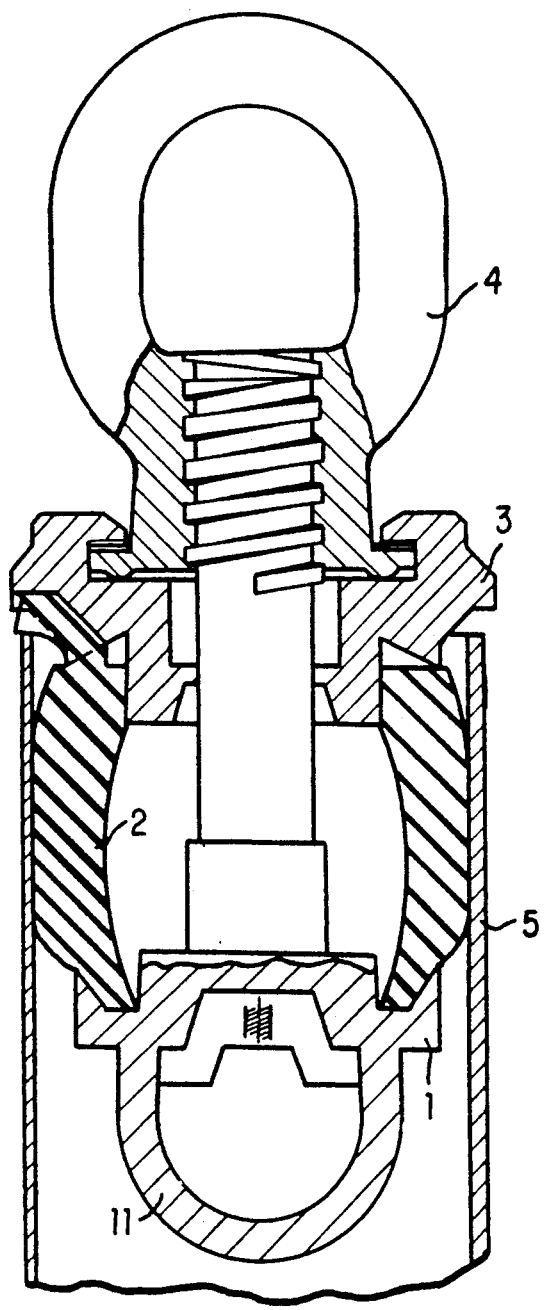
FIG. 7 is a sectional elevation of the pipe plug of FIG. 5, in which the elastic rubber band is squeezed to expand.

In FIG. 5 through 7, there is shown a pipe plug of smaller scale for sealing a pipe of relatively smaller size. Similar to the aforementioned embodiment, the elastic rubber band (2) comprises several elastic rubber pins (21) for setting in the grooves (35) of the trapeszoid pressure plate (3), so that the elastic rubber band (2) can be accurately squeezed to expand when the lifting eye (4) is tightly screwed up with the screw rod (12) of the fastening element (1).

I claim:

1. A pipe plug for sealing the orifice of a pipe, including: a disc-like fastening element, comprising a base plate having a peripheral circular groove in a face of said plate, the groove having a radially inwardly tapered wall portion, and a threaded rod upstanding therefrom in the center of the circle defined by the groove;

an elastic rubber band mounted on said fastening element, comprising an inwardly tapered bottom end, and a plurality of flexible rubber pins upstanding from the top wall surface thereof, the tapered end being received in the groove;

a pressure plate mounted on said elastic rubber band having a plurality of longitudinal grooves, a circular bottom end inserted into the top wall of the rubber band, an upper recess hole extending therethrough, two L-shaped retainer members mounted on the upper portion of said upper recess hole, said two L-shaped retainer members each having a plurality of convex strips on its bottom surface, an axial bore receiving the upper portion of the threaded rod therethrough, and a broken convex strip portion on the wall surface of the bore for centering said threaded rod of said disc-like fastening element in the axial bore, the rubber pins of said band being received in the longitudinal grooves of said pressure plate; and a lifting eye, comprising an inner thread portion receiving upper portion of the threaded rod of said fastening element, and a bottom flange having several convex strips thereon;

characterized in that the convex strips of said lifting eye engage and disengage the convex strips of said pressure plate to produce a striking sound, during the turning of said lifting eye on said threaded rod to loosen said elastic rubber band, so as to indicate the loosening of said elastic rubber band.

* * * * *